United States Patent [19]

Price

[11] Patent Number: 4,790,362
[45] Date of Patent: Dec. 13, 1988

[54] TIRE SHIELD DEVICE

[76] Inventor: Donald R. Price, 210 Elvin Ct., Lansing, Mich. 48912

[21] Appl. No.: 933,318

[22] Filed: Nov. 19, 1986

Related U.S. Application Data

[63] Continuation of Ser. No. 695,209, Jan. 25, 1985, abandoned.

[51] Int. Cl.⁴ ............................ B60C 23/18; B32B 3/10
[52] U.S. Cl. .................................. 152/153; 118/505;
150/54 B; 152/450; 280/156; 301/37 ST;
428/65; 428/911
[58] Field of Search ............... 152/155, 156, 189, 454,
152/455, 456, 518, 519, 539, 543, 544, 545, 525,
450, 151, 153; 301/37 R, 37 ST, 37 L, 37 TP, 37
PB; 206/304; 150/54 R, 54 B; 280/156;
118/504, 505; 428/65, 911

[56] References Cited

U.S. PATENT DOCUMENTS

| | | | |
|---|---|---|---|
| 1,875,067 | 4/1931 | MacKey | 280/156 |
| 1,905,674 | 1/1931 | Babbs | 280/156 |
| 2,017,891 | 8/1933 | Briggs | 152/208 |
| 2,334,388 | 11/1943 | Daniel | 152/353 R |
| 3,187,797 | 11/1963 | Fletcher et al. | 152/154 |
| 3,811,488 | 5/1974 | Duncan | 152/209 R |
| 4,030,530 | 6/1977 | Curtiss | 152/187 |
| 4,111,250 | 9/1978 | Bauer | 152/187 |
| 4,235,271 | 11/1980 | Olsen et al. | 152/186 |
| 4,252,169 | 2/1981 | Watts | 152/186 |
| 4,319,618 | 3/1982 | Suzuki | 152/185 |

*Primary Examiner*—Michael W. Ball
*Assistant Examiner*—Thomas Bokan
*Attorney, Agent, or Firm*—Ian C. McLeod

[57] ABSTRACT

A tire shield (10, 15) which mounts between the rim (100) and tire (101) and which covers the sidewall of the tire is described. The device has opposed convex and concave sides which have a radius of curvature smaller than that of the sidewall thus providing a space (27) between the shield and tire sidewall. The shield has a core of relatively penetration resistant rubber core (11, 16) which is preferably covered with a penetration resistant fabric (17).

8 Claims, 4 Drawing Sheets

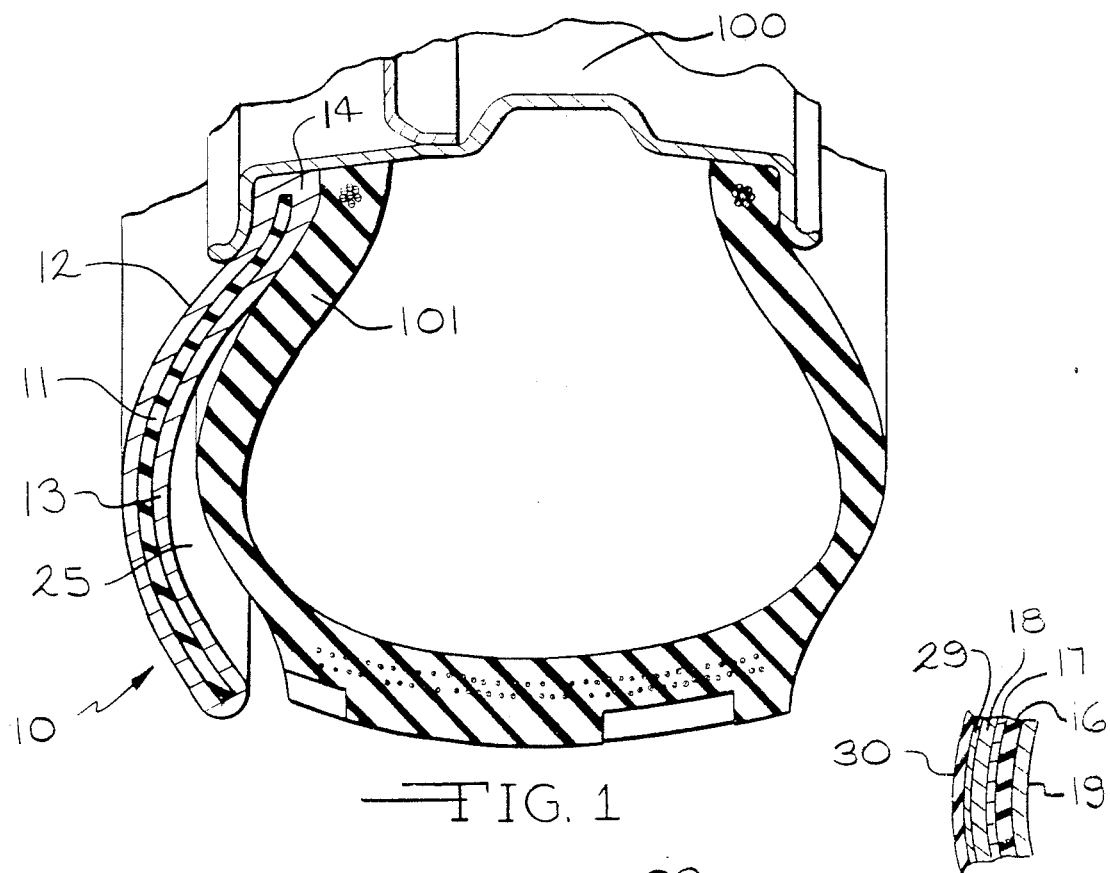
FIG. 1
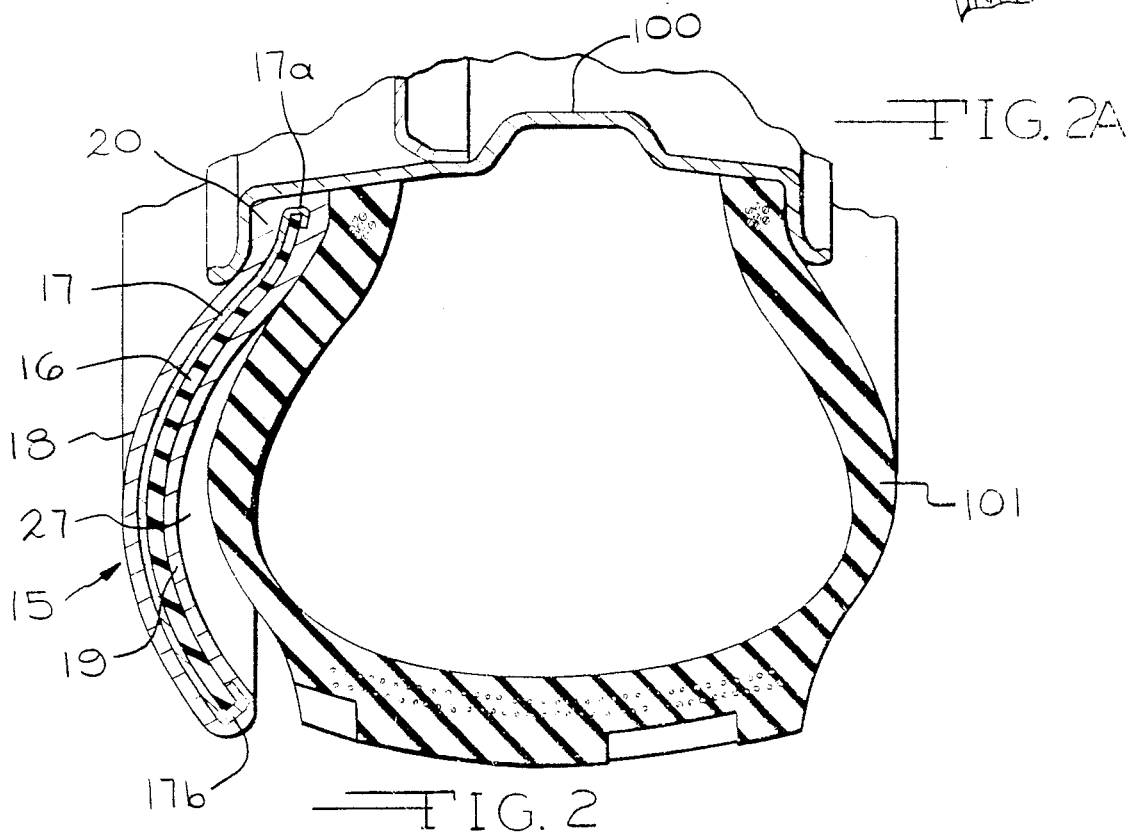
FIG. 2A
FIG. 2

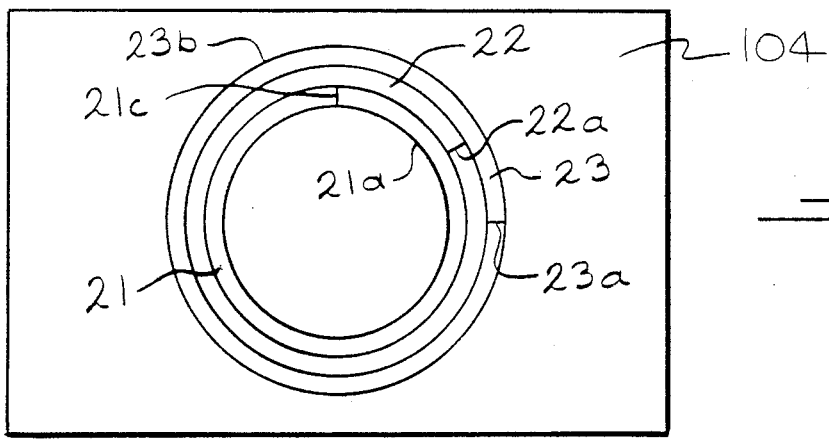
FIG. 6
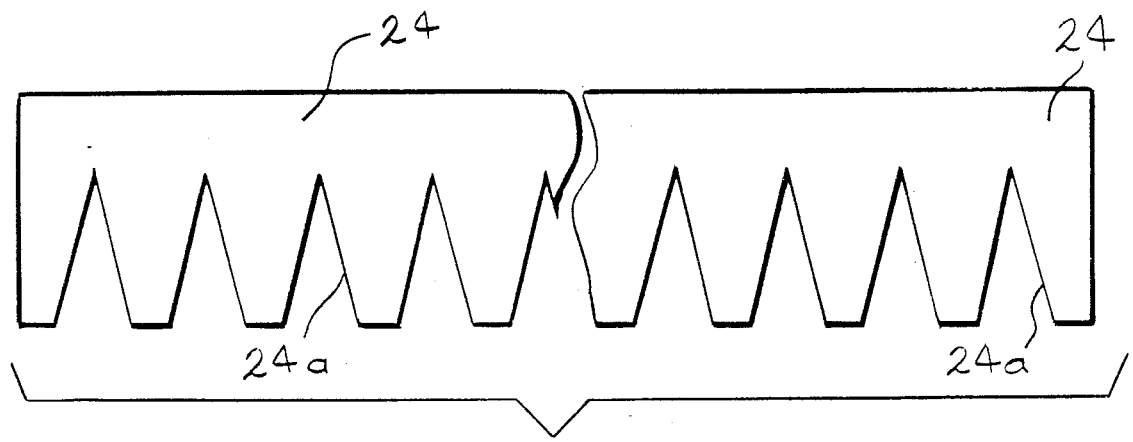
FIG. 7
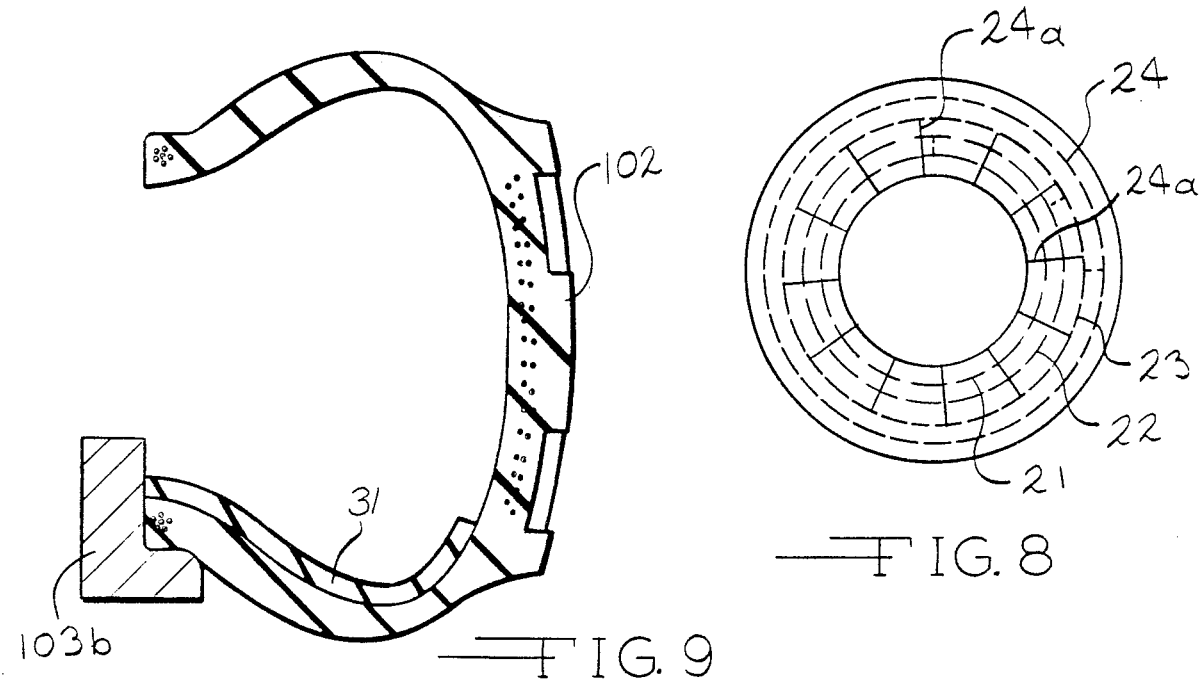
FIG. 8
FIG. 9

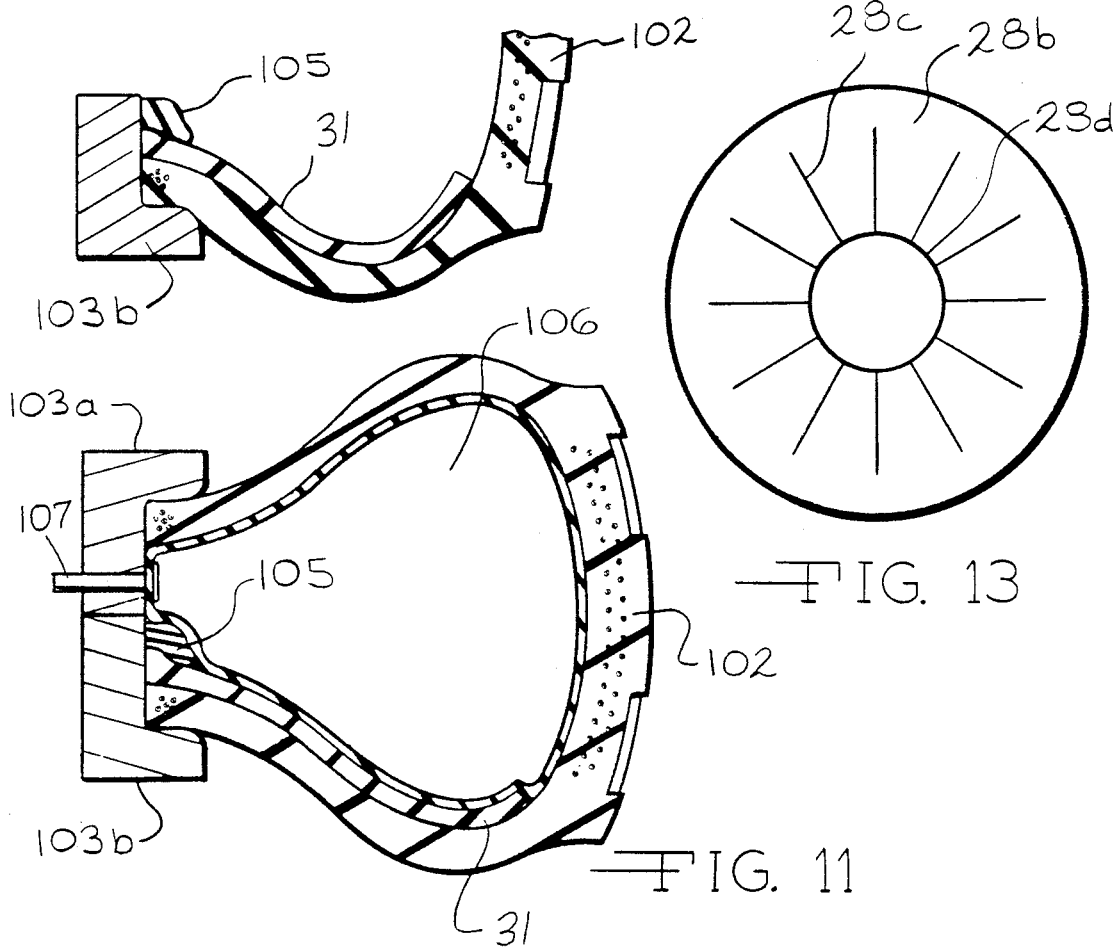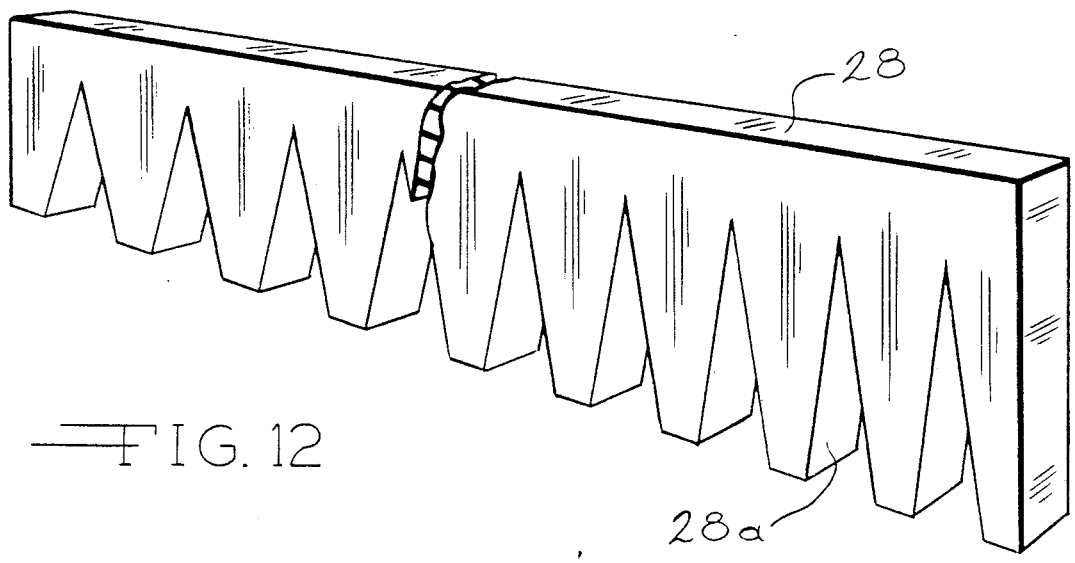

2

TIRE SHIELD DEVICE

This application is a continuation of application Ser. No. 06/695,209, filed Jan. 25, 1985, now abandoned.

BACKGROUND OF THE INVENTION (1) Field of the Invention

The present invention relates to a tire shield device mounted between the tire and rim which resists penetration of the side wall of the tire by foreign objects such as glass, stones, wire, steel and the like which would otherwise penetrate the side wall. The tire shield device is also constructed and mounted so as to allow a vehicle to be operated at high speed without causing the tire or the shield to overheat or come apart.

(2) Prior Art

The general prior art is shown by U.S. Pat. Nos. 3,811,488 to Duncan; 4,030,530 to Curtiss; 4,111,250 to Bauer; 4,235,271 to Olsen; 4,252,169 to Watts; and 4,319,618 to Suzuki. These patents show various devices for protecting the sidewall of off the road construction tires, none of which are high speed and travel an average of 5 mph. These later patents are more concerned with penetration protection for the sidewall of slow moving construction tires as used in mining, lumbering, scrap yards etc. U.S. Pat. Nos. 1,905,674 to Babbs; 1,875,067 to McKey and 2,017,891 to Brigqs show splash guards or skid protectors which are not designed for protecting the sidewall.

Some of the prior art patents are concerned with providing sidewall protection which is integral with the tire. This results in a relatively expensive and heavy tire. In other instances the prior art is concerned with sidewall protectors which bolt to the surface of the rim which supports the tire. When the tire shield is connected to the rim, considerable weight is added to the tire and rim, it is inconvenient and time consuming to mount the shield and the holes in the shield for mounting create failure points for the shield.

U.S. Pat. No. 3,187,797 to Fletcher et al describes a device for deflecting water from aircraft wheels. This device connects between the tire bead and the rim and is designed to extend based upon centrifugal force of the wheel and water pressure from under the tire. The device is not designed to resist penetration of the tire sidewall, since it extends only partially up the sidewall of the tire and it is intended only for aircraft use limited to landings or takeoffs.

The problem with the prior art tire shields is that they can come in contact with the sidewall of the tire in use and abrade the sidewall. Further, there can be a heat buildup between the shield and the tire where the shield is in contact with the sidewall at high speeds. Further still, the prior art shields tend to provide limited resistance to penetration because of their construction. This is why they are used for slow off the road vehicles.

In my prior U.S. Pat. Nos. 4,262,719, 4,263,074, 4,303,114 and 4,347,884, I described a method for forming a tire liner. The method of the present invention is different from the method of these prior applications because of the need to form a disc shaped shield.

OBJECTS

It is therefore an object of the present invention to provide a tire shield (10, 15) which straightens out or decambers away from the sidewall at high speeds due to centrifugal force thereby allowing air to circulate between the tire and the shield and which tends to close up or recurve at slower speeds encountered where sidewall protection is needed, such as grass mowing equipment and the like. Further it is an object of the present invention to provide a tire shield which has an air pocket (25, 27) between the shield and the side wall of the tire which aids in cooling the tire and also provides a back pressure when objects strike the shield to resist penetration of the sidewall of the tire. Further still, it is an object of the present invention to provide a tire shield which is simple and economical to manufacture and which is easy to mount on a tire rim when the tire is already mounted. These and other objects will become increasingly apparent by reference to the following description and the drawings.

IN THE DRAWINGS

FIG. 1 is a front cross-sectional view of a tire shield (10) of the present invention mounted on a tire rim (100) with a tire (101) and particularly showing a penetration resistant core (11).

FIG. 2 is a front cross-sectional view of the preferred tire shield (15) of the present invention mounted on a tire rim (100) with a tire wherein the tire shield includes a penetration resistant fabric (17) bonded to a core (16) of high penetration resistant rubber. FIG. 2A shows two layers of fabric (17, 29) in a shield.

Figure 3:
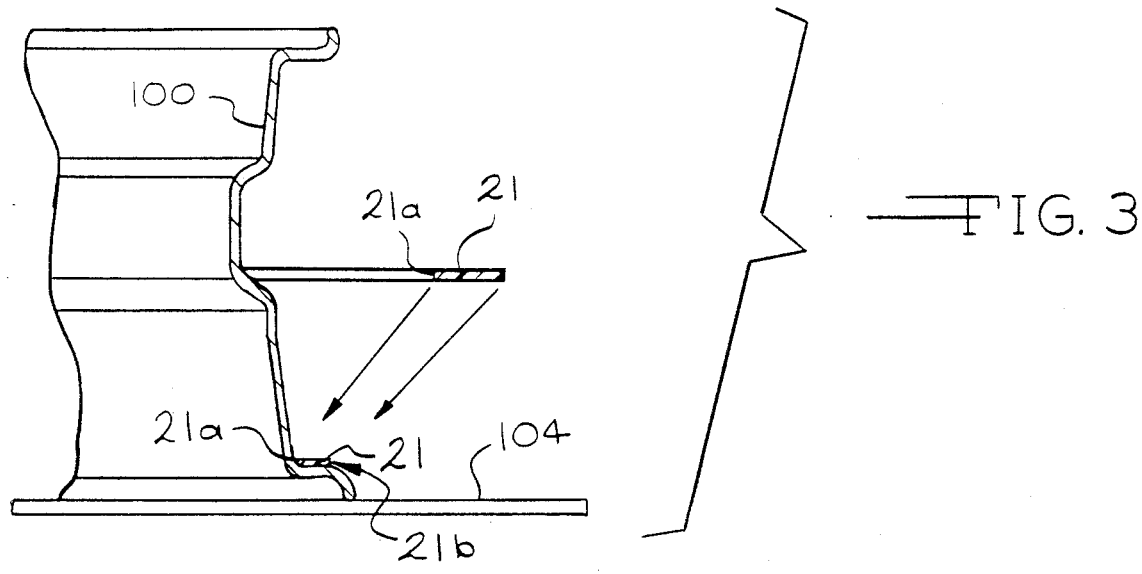

FIGS. 3 through 11 show various stages in the manufacture of the tire shield of the present invention. FIGS. 3 to 6 show the steps in the preferred method for forming the core (11 or 16) of a high penetration resistant rubber. FIGS. 7 and 8 show the cutting of the penetration resistant fabric (17) to form an annulus of fabric over the uncured rubber core of FIG. 6. FIGS. 9 to 11 show the molding and curing of the tire shield (15) in a tire mold using a curing tube (102) and split curing rim (103).

FIG. 12 shows a strip of uncured rubber wherein triangular portions have been removed so that the rubber can be shaped to form an annulus of rubber as shown in FIG. 13 having the dimensions shown in FIG. 6 as a single step in forming the core (11 or 16).

GENERAL DESCRIPTION

The present invention relates to a shield (10, 15) for protecting a sidewall of a tire (101) from penetration wherein the shield is to be mounted on a flange of a tire rim (100) over the sidewall which comprises: an annulus having a curved cross-section with opposed convex and concave wide sides and with opposed short sides between the wide sides, one short side defining an inner opening and providing a radially inside beam portion (14, 20) of the annulus with a diameter conforming to the diameter of one flange of the rim upon which the shield is to be mounted with the tire, wherein the shield has a tough rubber core (11, 16) and wherein there is an air pocket (27) between the sidewall of the tire and the concave side of the shield when the shield is mounted on the flange of the rim. It is preferred to have at least one penetration resistance layer of fabric (17, 29) bonded to the convex side of the annulus.

Further the present invention relates to a shield for protecting a sidewall of a tire (101) from penetration wherein the shield is to be mounted on a flange of a tire rim (100) over the sidewall which comprises: an annulus having a curved cross-section with opposed convex and concave wide sides and with opposed short sides between the wide sides one short side defining an inner opening as a bead portion (14, 20) of the annulus with a diameter conforming to the diameter of one flange of the rim upon which the shield is to be mounted with the tire, wherein the shield has a core (11, 16) of tough rubber surrounded by relatively softer rubber and wherein there is an air pocket (25, 27) between the side wall of the tire and the concave side of the shield when the shield is mounted on the flange of the rim. The shield is adjacent and of substantially the same radial extent as the tread of the tire as shown in FIGS. 1 and 2.

Finally the present invention relates to a method for fabricating a shield for protecting a sidewall of a tire (101) from penetration which comprises: providing a mold (102) having a concave molding surface corresponding to a convex side of the shield to be fabricated; providing a strip of rubber (21, 22, 23, 28) having opposing ends along a length and a cross-section with two long sides and two short sides wherein when the ends are joined together an annulus with an opening at one short side is formed; bonding the ends of the strip of rubber together to form a bonded annulus; providing the bonded in the mold with one long side against the concave molding surface and with a means (106) for applying pressure on the other long side of the bonded annulus; curing the bonded annulus in the mold to form a cured annulus as the tire shield (10, 15) with a cross-section which is concave on one long side and convex on the other long side; and removing the cured annulus from the mold.

In general the rubber core (11, 16) has a thickness of at least about ¼" and a durometer reading when cured of 72 to 84.

SPECIFIC DESCRIPTION

Figure 4:
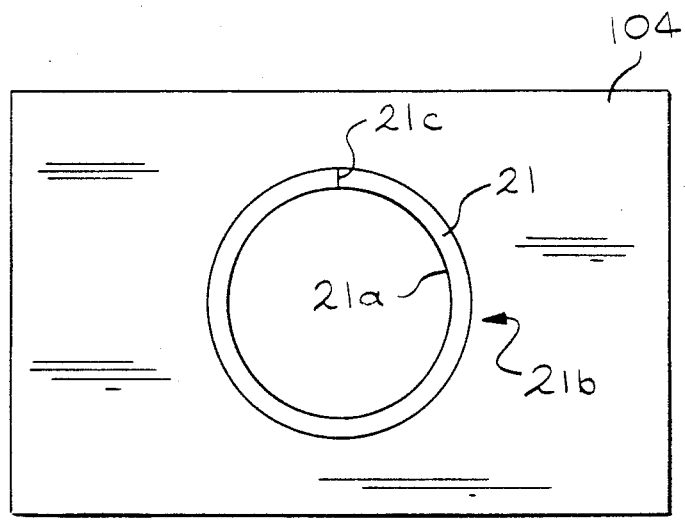

Referring to FIGS. 3 to 6, strips 21, 22, 23 of uncured penetration resistant rubber that cures at 280° F. were used. The strip was ¼" thick and 2" wide to provide the short sides 21a and long sides 21b respectively as were the strips 22 and 23. The cut ends 21c, 22a and 23a of each strip were cemented with rubber cement and allowed to dry so that they could be bonded together. Using a tire rim 100 as a form, the first strip of rubber 21 was heated and stretched so that it wrapped around the circumference of the rim 100 as shown in FIG. 3. The strip of rubber formed a complete circle as shown in FIG. 4 with the ends 21c stitched or bonded together, with rubber cement, on a flat surface 104. The inside short side 21a (in cross-section) of the strip 21 formed to the diameter of the wheel rim 100 so that the circumference was the same as the bead circumference of the tire to be mounted on the rim. The outside short side 21a was cemented and allowed to dry.

Figure 5:
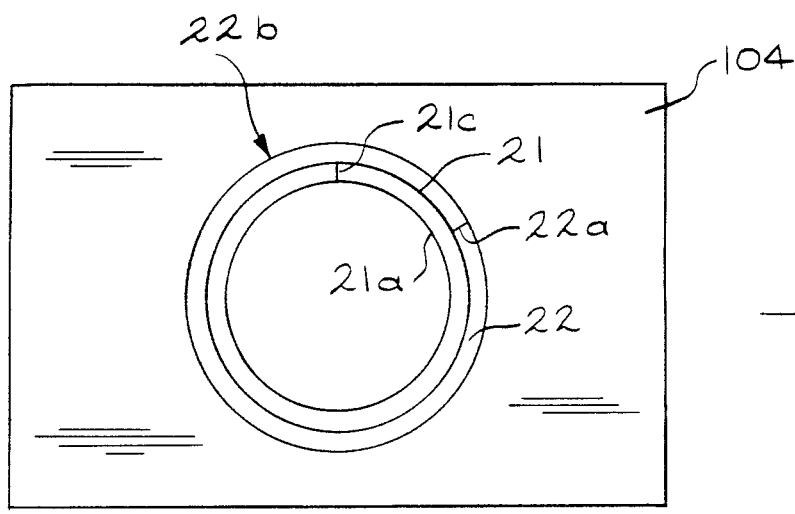

Another-strip 22 of the rubber was heated and stretched so that it was wrapped around the first strip 21 of rubber as shown in FIG. 5 with the ends 22a joined together. The second strip 22 of rubber was then bonded to the first annular strip 21 of rubber on short side 21a with rubber cement. Another third strip 23 of rubber was heated and stretched and bonded to the first two strips 21 and 22 of rubber on outside short side 22b in the same manner as shown in FIG. 6 with the ends joined together at 23a. This procedure was repeated until the width of the strips 21, 22, 23 together was the same as the width of the sidewall, cross section, of the tire 101 for which the shield was being built. Rubber cement was applied to the exposed surface of the multiple strips.

As shown in FIG. 7, a strip of Kevlar TM (Dupont) ballistic fabric 24 was cut to have a length the same as the circumference of the third strip 23 of rubber and a width 1" wider than the width of the combined strips of rubber. The strip of Kevlar TM fabric 24 was coated with a wetting solution, such as rubber solvent, and an all-purpose rayon or nylon uncured rubber cement and then was dried. Hexa as the wetting agent and Penacolite Resin B-18-S (Koppers, Pittsburg, Pa.) can also be used. The bonded but uncured annulus of high penetration resistant rubber strips 21, 22, 23 were taken off the wheel rim 100 and placed on the surface 104, taking care that the strips 21, 22, 23 did not separate from each other. Wedges 24a were cut out of one side and along a length of the fabric 24 with the wedges 24a being removed from about two-thirds the width of the fabric 24 as shown in FIG. 7. There was a 1" separation between each wedge 24a and the base of each wedge was 2 inches wide. This procedure was repeated through the length of the fabric strip 24.

The strip 24 of fabric was stitched onto the bonded annulus 21, 22, 23. The fabric 24 extended 1" over the exposed surface of the annulus as shown in FIG. 8 with the cutouts 24a joined together. A 1/32" thick cushion rubber 18 was applied over the entire surface of the fabric 24 and stitched into place. A second piece of fabric 29 was optionally then applied to the surface of the cushion rubber as shown in FIG. 2A. In this case the fabric 29 did not extend past the surface of the annulus 21, 22, 23. The second ply of fabric 29 was then covered with 1/32" thick tread stock rubber 30. This procedure can be repeated if more penetration resistance is desired.

The bonded annulus 21, 22, 23 was then turned over and cement was applied to the opposite side and dried. The extended length of fabric 24 was brought over around the outside short side 23b of strip 23 of bonded annulus 21, 22, 23 and stitched into place such as shown at 17a and 17b of FIG. 2. The entire surface of the bonded annulus 21, 22, 23 was then covered with cushion rubber 19. The completed bonded annulus 31 was then ready for curing as shown in FIGS. 9 to 11.

In curing, a tire 102 the size of the shield 10 or 15 to be built was used as a mold. The inside of the tire 102 was more like a circle than the outside of the tire so that when the bonded annulus 31 is cured as a tire shield and then attached to the outside of the tire 101 in use there was a smaller radius of curvature than the curvature of the sidewall of the tire 101 as shown in FIGS. 1 and 2 which resulted in an air chamber 24 or 27 between them.

A bead 105 was cut from a second tire (not shown) which aided in forming the tire shield bead 20 during curing. The tire 102 to be used as a mold was lubricated on the inside. The bonded annulus 31 was placed inside the tire mold with the fabric 24 side towards the inside surface of the tire 102. The bead 105 of the tire was then mounted on a curing rim 103b so that it rested on the shield as shown in FIG. 10. The bead 105 was lubricated to prevent its bonding to the tire shield. A curing tube 106 was lubricated and placed inside the tire 102 with the valve stem 107 extending through the rim 103a. The other portion of the rim 103b was secured on the tire 102 and tube 106 was aired to thirty pounds per square inch (30 psig). The assembly was then cured for three (3) hours at 280° to 300° F. to form the tire shield 15 as shown in FIG. 2 except with two layers of fabric 24 as shown in FIG. 2A. The tire shield 15 was then removed from the tire mold. The cured tire shield 15 has a cured core 16 with two fabric layers 17 and 29 and softer rubber layers 18, 19 and 30. There was a radially inside bead portion 20 between the rim 100 and tire 101.

It will be appreciated that a single strip 28 of rubber can be cut and bonded together to form a bonded annulus as shown in FIG. 2A in the manner of the fabric 24. This provides a means for building the uncured annulus of penetration resistant rubber in one step; however, this is not preferred. In this alternative method, the circumference of the bead was measured and wedges are cut out of the strip 28 across about ¾ of the width of the strip 28 so that the remaining strip with the removed portions 28a was equal to the bead circumference as shown in FIG. 12. The cut out portions 28a remaining were cemented. The cement was allowed to dry and then the strip was cemented together to form the bonded annulus 28b as shown in FIG. 13 which was used in the manner shown in FIGS. 9 to 11. It was found that by heating the uncured rubber for about five minutes at 300° C. that it was easier to form the uncured annulus 28b. Duck tape (not shown) was placed around the smaller circumference 28d of the annulus 28b in order to hold the parts together. Cement was applied to the opposite side and cushion rubber was stitched over the surface after the cement dried. The cushion rubber was also applied to the opposite side in the same manner. The shield was placed in the lubricated tire 102 mold and the tube 106 was aired and cured for three hours at 300° F. The resulting tire shield 10 was as shown in FIG. 1. The cured tire shield 10 has a core 11 formed by the strip 28 with cured cushion rubber on each side 12 and 13 and with a bead portion 14 between the tire 101 and rim 100.

The term "rubber" means a penetration resistant, polymeric (natural or synthetic) flexible material which is adapted to bonding with a cement. The "penetration resistant layer" can be composed of steel or other metal or plastic or fabric.

Numerous variations will occur to those skilled in the art. It is intended that all of these variations be included within the scope of the present invention.

I claim:

1. A shield protecting a sidewall of a tire having a ground contacting tread adjacent the sidewall from penetration by foreign objects and which is capable of use on a road at high speeds wherein the shield is mounted between a flange of a tire rim and a bead portion of the tire axially outward of and extending over the sidewall which comprises:

an annulus defining a foreign object penetration shield having a curved cross-section with opposed convex and concave wide sides and with opposed short sides between the wide sides, one short side defining an inner opening and providing a radially inside bead portion of the annulus with a diameter conforming to the diameter of one flange of the rim upon which the shield is mounted with the tire, wherein the shield has a penetration resistant rubber core, wherein the radially inside bead portion of the shield has been molded to conform to the shape of an axially outside portion of the bead of the tire and which mates with the flange so as to mount axially between the flange of the rim and said bead portion of the tire, wherein there is an air pocket between the sidewall of the tire and the concave side of the shield when the shield is mounted on the flange of the rim, wherein a radially outer portion of the shield is adjacent and of substantially the same radial extend as the tread of the tire and wherein the shield straightens out or decambers away from the sidewall of the tire due to centrifugal force upon rotation at a high speed above 5 mph of the shield with the tire and flange.

2. The shield of claim 1 wherein at least one penetration resistant layer of fabric is bonded on the convex side of the annulus.

3. A shield protecting a sidewall of a tire having a ground contacting tread adjacent the sidewall from penetration by foreign objects and which is capable of use on a road at high speeds wherein the shield is mounted between a flange of a tire rim and a bead portion of the tire axially outward of and extending over the sidewall which comprises:

an annulus defining a foreign object penetration shield having a curved cross-section with opposed convex and concave wide sides and with opposed short sides between the wide sides one short side defining an inner opening as a radially inside bead portion of the annulus with a diameter conforming to the diameter of one flange of the rim upon which the shield is mounted with the tire, wherein the shield has a core of penetration resistant rubber surrounded by relatively softer rubber which has been molded to the curved cross-section with the core, wherein the axially inside bead portion has been molded of the softer rubber onto the core to conform to the shape of an axially outside portion of the bead of the tire and which mates with the flange so as to mount axially between the flange of the rim and said bead portion of the tire, wherein there is an air pocket between the side wall of the tire and the concave side of the shield when the shield is mounted on the flange of the rim, wherein a radially outer portion of the shield is adjacent and of substantially the same radial extent as the tread of the tire and wherein the shield straightens out or decambers away from the sidewall of the tire due to centrifugal force upon rotation at a high speed above 5 mph of the shield with the tire and flange.

4. The shield of claim 3 wherein at least one penetration resistant layer of fabric is bonded between the core and the softer rubber on the convex side of the annulus.

5. The shield of claim 4 wherein the fabric overlaps the core adjacent the short sides of the annulus.

6. The shield of claim 5 wherein the fabric is a penetration resistant polyester resin fabric.

7. The shield of claim 1 wherein the short sides of the core of the annulus have a thickness of at least about ¼" and a Durometer reading of 72 to 84.

8. The shield of claim 1 wherein a penetration resistant layer is bonded on the convex or concave side of the annulus.

* * * * *

UNITED STATES PATENT AND TRADEMARK OFFICE
CERTIFICATE OF CORRECTION

PATENT NO. : 4,790,362

DATED : December 13, 1988

INVENTOR(S) : Donald R. Price

It is certified that error appears in the above-identified patent and that said Letters Patent is hereby corrected as shown below:

Column 1, line 28 "Brigqs" should be --Briggs--.

Column 2, line 52 "beam" should be --bead--.

Column 3, line 23 after "bonded", --annulus-- should be inserted.

Column 6, line 7 "extend" should be --extent--.

Signed and Sealed this

Thirteenth Day of June, 1989

Attest:

DONALD J. QUIGG

Attesting Officer

Commissioner of Patents and Trademarks